Figure 7:
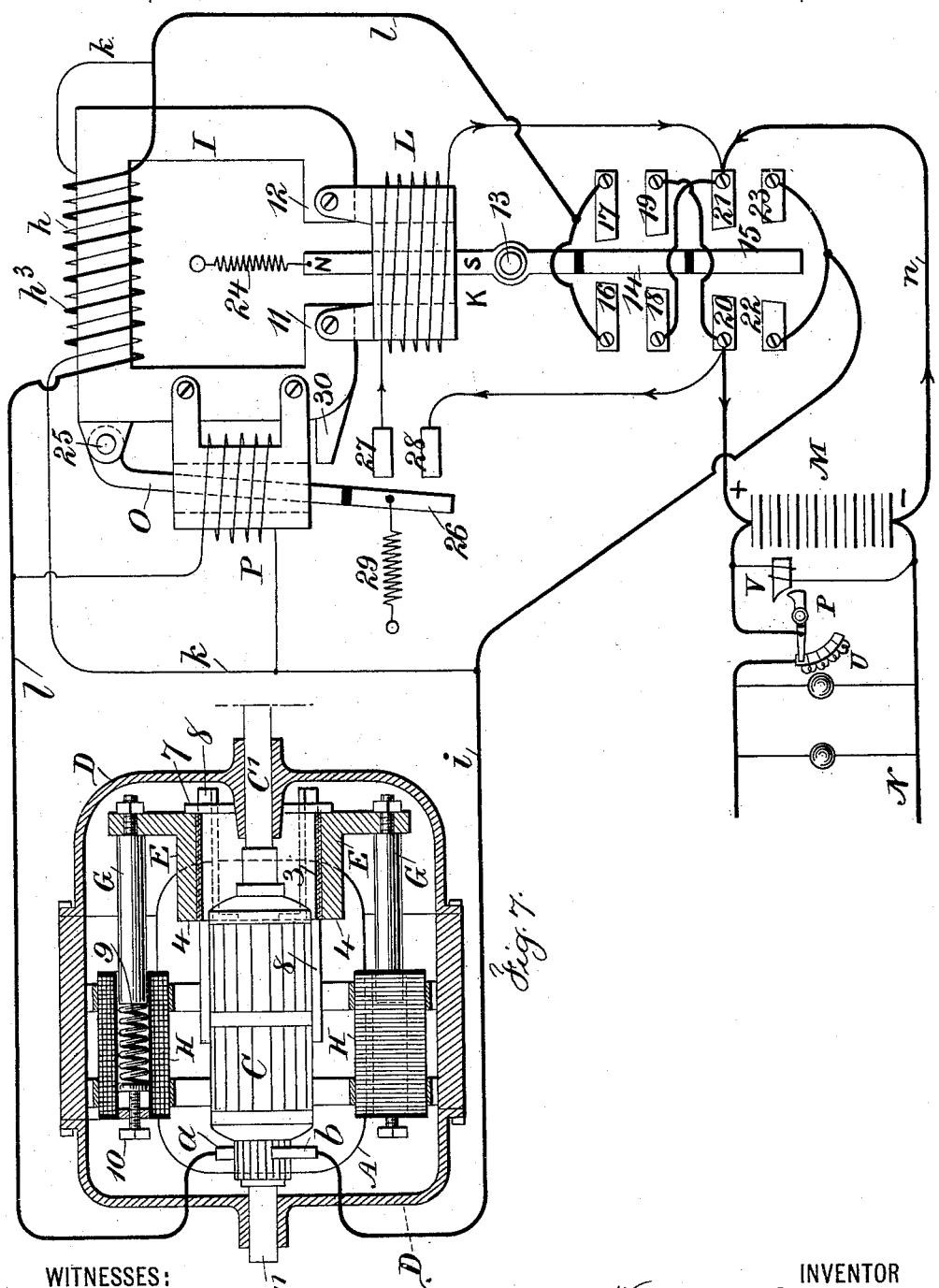

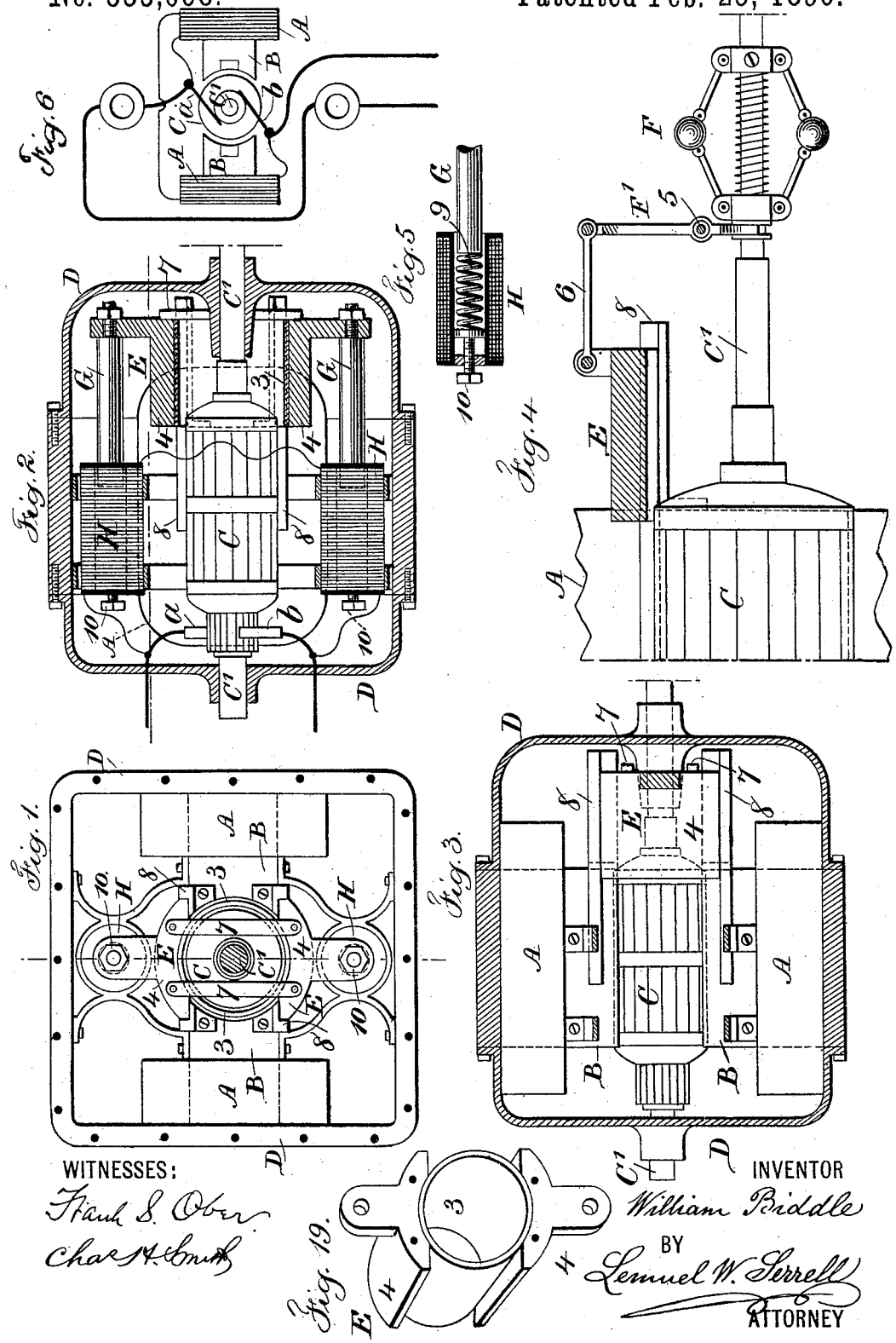

(No Model.) 3 Sheets—Sheet 2.

W. BIDDLE.
ELECTRIC CAR LIGHTING APPARATUS.

No. 555,068. Patented Feb. 25, 1896.

WITNESSES:
Frank S. Ober
Chas. H. Smith

INVENTOR
William Biddle
BY
Lemuel W. Serrell
ATTORNEY (No Model.) 3 Sheets—Sheet 3.
W. BIDDLE.
ELECTRIC CAR LIGHTING APPARATUS.
No. 555,068. Patented Feb. 25, 1896.
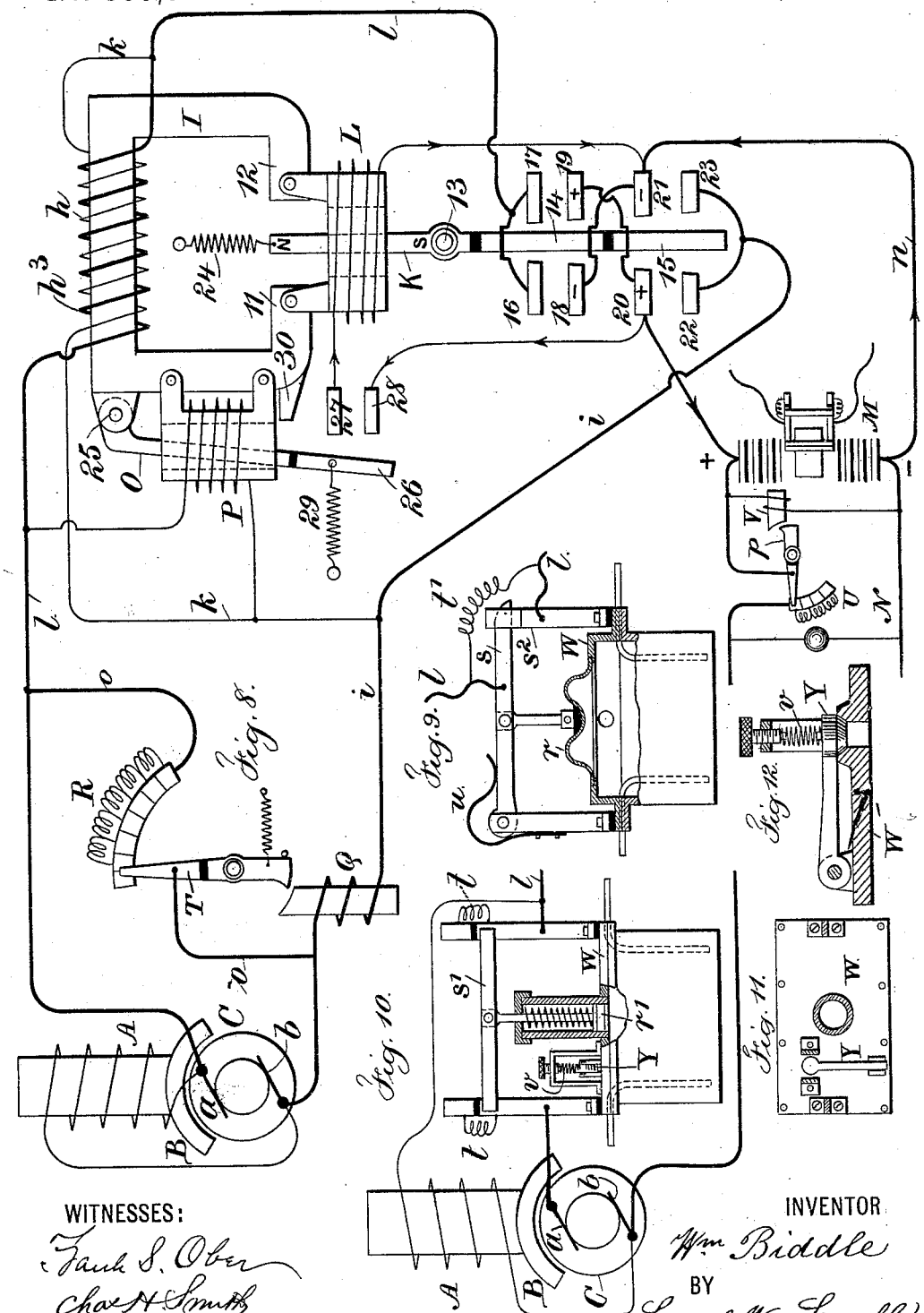
WITNESSES:
Frank S. Ober
Chas H Smith
INVENTOR
Wm Biddle
BY
Lemuel W. Serrell
ATTORNEY

UNITED STATES PATENT OFFICE.

WILLIAM BIDDLE, OF BROOKLYN, NEW YORK.

ELECTRIC CAR-LIGHTING APPARATUS.

SPECIFICATION forming part of Letters Patent No. 555,068, dated February 25, 1896.

Application filed December 24, 1894. Serial No. 532,764. (No model.)

*To all whom it may concern:*

Be it known that I, WILLIAM BIDDLE, a citizen of the United States, residing at Brooklyn, in the county of Kings and State of New York, have invented an Improvement in Electric Car-Lighting Apparatus, of which the following is a specification.

In apparatus for lighting railway-cars by incandescent electric lamps difficulties have heretofore been experienced in maintaining a uniform voltage from the dynamo when running under the different speeds resulting from the armature being connected with the axle of the car, and when the speed lessens, so that the electromotive force sinks below that of the secondary battery supplying the lights, it is necessary to break the circuit passing through the armature of the dynamo to prevent the secondary battery discharging through the same. In addition to the foregoing, difficulty has also been experienced of the incandescent lamps varying in their luminosity in consequence of changes in the speed of the armature or in consequence of more or less resistance being thrown into the circuit that supplies such secondary battery, and it is also necessary to reverse the circuit connections, so that the current reaching the secondary battery will not be reversed when the car is running in an opposite direction.

To remove the difficulties heretofore named and to accomplish the desired objects, I make use of a movable magnetic intercepter between the armature and the poles of the field-magnets, the same being controlled automatically according to the speed of rotation of the armature, so that as the speed increases the intercepter will short-circuit the lines of magnetism between the poles of the field-magnets, and thereby lessen the number of lines of magnetism that are cut by the wires of the armature and unify the current developed by varying the position of the intercepter, according to the speed of the car, and I place in the working circuit containing the lamps a resistance or rheostat controlled by a magnet in multiple arc with the lamps, so as to maintain the light from the lamps as nearly uniform as possible by increasing the resistance if too strong, or lessening the resistance in the working circuit if the voltage of the current passing from the secondary battery is decreased, and I also make use of a switch actuated by one or more cells of the secondary battery, the gaseous pressure in such cell being made use of for regulating the said switch, and either short-circuiting the current between the brushes or throwing in a resistance into such circuit, according to the gaseous pressure that may be developed in operating the said secondary battery.

In the drawings, Figure 1 is an end elevation of the dynamo. Fig. 2 is a partial section showing the magnetic intercepter and the armature in elevation. Fig. 3 is a plan view with the inclosing case in section and the upper magnet removed. Fig. 4 is a diagrammatic view illustrating a speed-governor for giving motion to the magnetic intercepter. Fig. 5 is a detached section of one of the magnets for moving the magnetic intercepter. Fig. 6 is a diagram representing the circuit connections from the brushes through the intercepter-magnets and the field-helices in a shunt between the brushes. Fig. 7 is a diagram representing the dynamo similar to that in Fig. 2 and with the circuit connections to the secondary battery and the switches. Fig. 8 is a similar diagram to Fig. 7, but showing the field-helix in a shunt and a rheostat and switch for regulating the resistance in the circuit passing to the secondary battery. Fig. 9 is a section representing a switch actuated by the gas in a cell of the secondary battery. Fig. 10 is a diagram of a similar switch with the circuit connections to the field-helix in a shunt between the brushes. Figs. 11 and 12 represent the cap or closing-plate of the secondary battery cell, with the devices for preventing injury by excessive pressure. Fig. 13 is a perspective view of the intercepter.

The helices A surround the poles B of the dynamo, and between these the armature C is supported, and I have shown the shaft C' of the armature passing through bearings upon the case D, which is adapted to surround the dynamo and exclude dust, and this shaft C' is provided with any suitable connection by which it is driven from the axle of the car, and it is usually advantageous to provide in the poles B pieces of hardened steel, as shown in Fig. 6, so as to retain sufficient magnetism for starting the dynamo after the same has been at rest, and the brushes *a* and *b* are provided for taking off the current from the commutator-plates, as usual, and I remark that the armature, the field-helices and field-magnets are to be of any desired character, as the present improvements are generally available in dynamos.

The movable magnetic intercepter E is adapted to be slid in between the poles and the armature, and it is of a material adapted to conduct the lines of magnetism and deflect them from the armature, and with this object in view I prefer to employ a soft-iron tube 3 and the intercepters 4 therewith connected, such intercepters being adapted to extend across the space between one pole and the next, as illustrated in Fig. 1, and such intercepters 4 and the tube 3 being either permanently connected together or made in one, the tube 3 receives the lines of magnetism between the poles and deflects them through the intercepters 4, so that the lines of magnetism pass outside of the tube 3, and it will be apparent that if the tube 3 and the intercepters 4 are of such a size as to entirely inclose the armature and intervene between the same and the poles, the lines of magnetism between the poles will be diverted so that there will not be lines of magnetism to be cut by the revolving armature, and hence there will not be any current developed in the armature, or the current will be so weak as to be comparatively valueless; but when the magnetic intercepter is drawn away from between the armature and the poles the lines of magnetism passing between the poles are cut by the wires of the revolving armature and the maximum current developed. In order therefore to unify the current developed regardless of the speed, it is only necessary to move the magnetic intercepter endwise of the armature in proportion to the speed of the armature, and when the speed is increased the intercepter is passed farther in between the poles and the armature, and when the speed of the armature is lessened the intercepter is withdrawn in proportion.

It will now be understood that a suitable means is required to give motion to the intercepter in proportion to the speed. I have represented in Fig. 4 governor-balls F and a lever F' pivoted at 5 and provided with a link 6 to the magnetic intercepter, and the parts are to be proportioned in such a manner that an end movement is given to the magnetic intercepter in proportion to the speed to regulate and unify the development of the current through the armature.

I have represented the bars 7 as connecting the two intercepters 4 together and the slides 8 as continuations from the ends of the pole-pieces upon which the edges of the intercepters 4 can be slid, and I remark that any suitable guides may be provided for allowing the intercepter to be moved endwise, and where the intercepters 4 are closely adjacent to the edges of the poles B it is advantageous to provide pins or small pieces of brass either upon the poles or upon the surfaces of the intercepters adjacent to the poles, such pieces of brass or similar non-magnetic material projecting slightly, so as to prevent the surfaces of the iron or other magnetic material of the intercepters coming into direct contact with the magnetized poles of the field-magnets, and permit the parts to be moved with facility.

In Figs. 1, 2, 5 and 7 I have represented magnet-cores G as connected with the end portions of the intercepters 4, such magnet-cores being adapted to pass into the helices H, and these helices are connected into the circuit in such a manner that when the current set up by the armature increases the cores are drawn into the helices and the magnetic intercepter moved along to reduce the number of lines of magnetism and lessen the output of the armature, and springs 9 of any suitable character are adapted to give a motion in the opposite direction, and such springs may be adjusted in any suitable manner—such, for instance, as by the screws 10. It will be apparent that the same object will be effected by moving the armature endwise of its shaft so as to draw it out more or less from between the poles of the field-magnets, and when such armature is drawn out its wires will not cut as many lines of magnetism as when it is in its normal position, entirely between the poles of such field-magnets, and the end movement given to the armature itself so that its wires may intercept and cut more or less of the lines of magnetism is the equivalent of the intercepting-shield, before described.

In the foregoing devices the current set up in the armature is rendered uniform or nearly so by an end movement that is given in proportion to the speed of rotation of the armature, so that a less number of lines of magnetism are cut by the wires of the armature when the armature is revolving at a high speed and a larger number of lines of magnetism are cut by the wires of the armature when such armature is revolving at a lower speed.

In Figs. 7 and 8 a compound pole-changer or switch and circuit-breaker is represented. In this I is an electromagnet having pole-pieces 11 and 12 that stand opposite to each other, and between them is the circuit-reversing or pole-changing lever K, and it is advantageous to polarize the end of this lever K that is between the poles 11 and 12, and with this object in view a helix L is provided around the end of such lever K, such helix being wound with an elongated opening to allow the lever K to move in the same and between the poles 11 and 12, such lever swinging on a pivot 13, and upon the lever K are circuit-closing plates 14 and 15, that are insulated from each other and are between the contacts 16 17 18 19 20 21 22 23, and there is a spring 24 that brings the lever K into a central position and out of contact with either of the circuit-closing plates, and this is to take place, as hereinafter described, when the car is standing still or when the speed lessens so that the current developed by the rotation of the armature is less than the current developed by the secondary battery M, and at N, I have represented a working circuit with incandescent lamps, which of course may be more or less numerous, for lighting the car. I also provide a switch O pivoted at 25 and having an insulated plate 26, that either closes or breaks the circuit between the plates 27 and 28, and there is a spring 29 to draw back the switch O and a helix P by which the switch-lever O is polarized and caused to be attracted by the pole-piece 30 or repelled by the same, according to the polarity of such pole-piece and of the iron switch-lever, as the polarity of such switch-lever may be changed according to the direction of the current passing through the helix P.

Referring now to Fig. 7, the circuit connections from the brushes $a$ $b$ are represented as passing by the main-circuit wire $i$ to the contacts 22 and 23, and by the wire $l$ through the helix $h$ of the electromagnet I to the contacts 16 and 17, and the poles of the secondary battery M are connected to the contacts 20 and 21, and there are cross-wires between 18 and 21 and 19 and 20, and a local circuit is provided containing the helix L and terminating at the contacts 27, 28, and 20 and 21, respectively; and it will be apparent that when the lever K is in the position represented in Figs. 7 and 8 the secondary battery M is not connected to the brushes $a$ $b$ because the circuit to the same is broken between 27 and 28, and the lever K is not in contact with either of the plates 16, 17, 18, 19, 20, 21, 22, or 23, and in this position the electric lights in multiple arc in the circuit N are only operated by the energy of the secondary battery M.

When the electromotive force set up by the rotation of the armature C is sufficient to energize the helix P and polarize the switch O, so that it is attracted by the pole-piece 30, the plate 26 closes the circuit of the secondary battery by contact with the plates 27 and 28, and the current from the battery flowing through the helix L polarizes the switch-lever K and simultaneously the electromagnet I is energized by the current flowing through the wires $i$ and $l$ from the brushes $a$ $b$, and passing by the wire $k$ and helix $h$ of the magnet I to the wire $l$ and the helix $h^3$ of such magnet I, of which the wire $l$ is a part. Hence the poles 11 and 12 of the magnet I will be polarized according to the direction of rotation of the armature C, and the polarized end of the lever K will move toward the pole 12 or toward the pole 11. If the lever K moves toward the pole 12 the plate 14 will close circuit between 16 and 18, and the plate 15 will close circuit between 20 and 22, and in this position the current will pass from $b$ by $i$ 22 15 20 and to the + end of the secondary battery M, and from the negative end of the secondary battery M it will pass by the wire $n$ to 21 18 14 16 to $l$ and thence to the brush $a$. Thus the current set up in the armature C will pass to the secondary battery whenever such current is greater than the current set up by the secondary battery. If the polarity of the magnet I is such that the lever K is moved toward the pole 11, then the plate 14 makes contact with 17 and 19, and the plate 15 with 21 and 23, and the current passes from the brush $a$ by $l$ to 17, and by the plates 14, 19, and 20 to the + end of the secondary battery M, and by the wire $n$ to 21 and 23 to the wire $i$ and brush $b$.

When the speed of the armature C decreases so that the electromotive force set up thereby only equals or is less than the electromotive force of the secondary battery, the currents neutralize themselves in the circuit between the secondary battery M and the brushes $a$ $b$, the magnet I becomes neutral, the switch K assumes the position shown in Figs. 7 and 8, breaking the circuits, and simultaneously the magnetism in P is neutralized. The spring 29 draws the switch O backwardly, breaking contact between 27 and 28, and there are no complete circuit connections to the secondary battery, except those in the working circuit N containing the incandescent lamps.

The circuit connections shown in Fig. 8 are identically the same as those shown in Fig. 7, with the exception that I provide a rheostat R in a shunt-circuit between the wires $i$ and $l$ and make the helix of the electromagnet Q a part of the circuit-wire $i$, and provide a lever T, one end of which forms an armature to the electromagnet Q. Hence when the electromotive force in the circuit $i$ $l$ may rise the lever T is moved by the magnet Q and short-circuits a portion of the rheostat R, lessening the resistance in the shunt $o$ between the circuit-wires $i$ $l$, thereby allowing a portion of the current to pass back again to the brushes, and this rheostat is especially useful in lessening the risk of fluctuations in the line from the incandescent lamps and tends to unify the current passing to the storage-battery and to the incandescent lamps under the various speeds of rotation of the armature as driven by the car-axle. I also find it advantageous to employ a rheostat U in the working circuit N with a lever $p$, one end of which forms an armature to the electromagnet V, the helix of which is in multiple arc with the incandescent lamps in the working circuit, and in the normal position the lever $p$ simply closes the working circuit N; but in case of sudden rise in the current set up by the dynamo the magnet V is energized in proportion, and by moving the lever $p$ throws into the circuit more or less of the coils of the rheostat U to increase the resistance in that circuit and unify the current acting in the lamps.

In the secondary batteries a gas is developed in the cells while the battery is being charged, and that gas is reabsorbed during the discharge of the battery. I avail of this fact to aid in rendering the car-lighting system uniform, and with this object in view one or more cells in the secondary battery is provided with a gas-tight cap W, and the pressure of the gas generated acts upon a flexible diaphragm $r$ or upon a piston $r'$ to give motion to a lever $s$ or circuit-changer $s'$, Figs. 9 and 10, and when the parts are connected in the manner represented in Fig. 10 the current passes from the brush $a$ directly through the circuit-closer bar $s'$ to a circuit-wire $l$, and in this figure the helix of the field-magnet A is in a shunt between the brush $b$ and the wire $l$. If now the gas-pressure in the cell becomes abnormal in consequence of the secondary battery being charged, the pressure of gas moves the bar $s'$ and brings into the circuit the resistances $t$ that are interposed between the insulated portions of the plates upon which the ends of the bar $s'$ slide, and when the pressure of gas in the secondary-battery cell diminishes the parts are restored by the spring that acts upon the piston $r'$ to their normal position.

In Fig. 9 a similar operation is effected, the rheostat or resistance $t'$ being in a shunt between the two portions of the circuit-wire $l$, one end of such wire $l$ being connected to the lever $s$ and the other end to the plate with which such lever $s$ is normally in contact, so that when the diaphragm $r$ is moved by the pressure of gas that accumulates the lever $s$ is moved and separates from the contact-plates $s^2$ and thereby throws the resistance $t'$ into the circuit $l$, and when the pressure of gas lessens the spring $u$ restores the parts to their normal position.

In consequence of the gas-tight cap W inclosing the gas that may be generated in the cell there is a risk of injury to the cell. I therefore provide a safety-valve Y of any suitable character (the same as represented in Figs. 11 and 12) in the form of a lever with a conical valve at the end closing an opening in the cap W, and the spring $v$ can be adjusted so as to apply any desired pressure to the safety-valve.

Where the helix of the field-magnet A is in a shunt between the brushes $a$ $b$, Fig. 8, the current going through such helix will depend on the resistance in the main circuit $i$ $l$. If now the shunt $o$ was of little or no resistance the current would all go by such shunt $o$ between the brushes and the field-magnet A not receiving a current, the magnetism in A would lessen and finally cease and so would the current in the shunt between the brushes, the magnetism and current running down simultaneously. I avail of this condition to unify the output of current from the dynamo regardless of the speed of rotation of the armature, because when the output of current increases in consequence of the increase of speed as before set forth, the magnet Q moves the rheostat-lever T and lessens the resistance in the shunt $o$, and consequently the current passing through the helix A is correspondingly lessened and the electromotive force of the dynamo is cut down to the normal or desired amount regardless of the speed of rotation of the car-axle and armature, and as the speed lessens and the output falls slightly the lever T brings more resistance into the shunt and the magnetism of A is augmented and a substantial uniformity of current obtained regardless of speed.

A spring is provided as usual to move the lever T in the opposite direction to the electromagnet Q and the shunt $o$ T R between the brushes is normally broken until the speed of rotation of the armature is sufficient to generate the maximum current, and thereafter the energy of the electromagnet Q is sufficient to move the lever T and close the shunt between the brushes and thereby cut down the magnetism of the field-helices, and the farther the lever T is moved the less resistance there is in the shunt and the more effectively is the development of current stopped.

I claim as my invention—

1. The combination with the field-magnets and armature in a dynamo, of a magnetic intercepter and means for moving the same endwise of the armature in proportion to the speed of the armature to intercept the lines of magnetism as the speed of the armature is increased or the reverse, substantially as set forth.

2. The combination with the field-magnets and the armature in a dynamo, of a magnetic intercepter having a tube of iron or other magnetic conductor between the armature and the poles of the field-magnet, and means for sliding such intercepter between the armature and the pole, to shorten the field-poles in the direction of the armature-axis, substantially as set forth.

3. The combination with the field-magnets and the armature in a dynamo, of a magnetic intercepter having a tube of iron or other magnetic conductor between the armature and the poles of the field-magnet, and intercepters of iron or similar material upon the sides of the tube and between the poles of the field-magnets, and means for giving a motion to the intercepter endwise of the armature for varying the width of the field-poles, substantially as set forth.

4. The combination with the field-magnets and the armature in a dynamo, of a magnetic intercepter having a tube of iron or other magnetic conductor between the armature and the poles of the field-magnet, and intercepters of iron or similar material upon the sides of the tube between the poles of the field-magnets, and guides for sustaining the movable magnetic intercepter in its movements endwise of the armature, substantially as set forth.

5. The combination with the field-magnets and the armature in a dynamo, of a magnetic intercepter having a tube of iron or other magnetic conductor between the armature and the poles of the field-magnet, and intercepters of iron or similar material upon the sides of the tube and between the poles of the field-magnets, and an electromagnet and core for giving motion to the movable magnetic intercepter endwise of the armature, substantially as set forth.

6. The combination in an apparatus for lighting cars electrically, of a dynamo receiving its motion from the car-axle, a secondary battery and incandescent lamps in its working circuit, a switch-lever and circuit connections for directing the current to the secondary battery, an electromagnet for moving the switch-lever, a helix in a circuit between the poles of the secondary battery for polarizing the switch-lever, and an automatic switch for making and breaking the said circuit when the current set up by the dynamo becomes lower than that from the secondary battery and for closing the circuit of the secondary battery when the current from the dynamo exceeds that from the secondary battery, substantially as set forth.

7. The combination in a car-lighting apparatus with the dynamo and the secondary battery, of a working circuit to the secondary battery containing incandescent lamps, an electromagnet in multiple arc with the incandescent lamps, a rheostat and lever actuated by the said electromagnet for throwing into the lamp-circuit from the secondary battery a resistance in case of abnormal development of current, substantially as set forth.

8. The combination in a car-lighting apparatus with the dynamo and the secondary battery, of a cap for closing one or more secondary cells, a closed main circuit containing a resistance and a circuit-changer supported by such cap, and a yielding device between the circuit-changer and the cap acted upon by the pressure of the gas for separating the parts of the circuit-changer by the pressure and causing the resistance to lessen the current passing to the secondary battery, substantially as set forth.

Signed by me this 21st day of December, 1894.

WILLIAM BIDDLE.

Witnesses:
　GEO. T. PINCKNEY,
　S. T. HAVILAND.